(12) United States Patent
Pastore

(10) Patent No.: US 7,822,335 B1
(45) Date of Patent: Oct. 26, 2010

(54) LENS PROTECTOR

(75) Inventor: Timothy M Pastore, Wakefield, MA (US)

(73) Assignee: Microscan Systems, Inc., Renton, WA (US)

( * ) Notice: Subject to any disclaimer, the term of this patent is extended or adjusted under 35 U.S.C. 154(b) by 267 days.

(21) Appl. No.: 11/903,379

(22) Filed: Sep. 21, 2007

Related U.S. Application Data

(60) Provisional application No. 60/846,286, filed on Sep. 21, 2006.

(51) Int. Cl.
| | |
|---|---|
| G03B 15/06 | (2006.01) |
| G03B 17/00 | (2006.01) |
| G03B 11/00 | (2006.01) |
| G02B 6/00 | (2006.01) |
| G02B 7/02 | (2006.01) |
| G05D 25/00 | (2006.01) |
| H04N 5/222 | (2006.01) |

(52) U.S. Cl. .............. 396/199; 396/267; 396/544; 348/370; 362/551; 362/552; 362/558

(58) Field of Classification Search .............. 396/199, 396/267, 155, 449, 544; 362/551, 555, 558; 348/370, 371
See application file for complete search history.

(56) References Cited

U.S. PATENT DOCUMENTS

| | | | |
|---|---|---|---|
| 2,357,378 A | 9/1944 | Benford | |
| 3,726,998 A | 4/1973 | Szpak et al. | |
| 3,857,626 A | 12/1974 | Rosenberger et al. | |
| 3,918,028 A | 11/1975 | Humphrey et al. | |
| 4,128,298 A | 12/1978 | McMillan | |
| 4,232,219 A | 11/1980 | Yamamoto et al. | |
| 4,298,262 A * | 11/1981 | Nozawa et al. | 396/199 |
| 4,475,796 A | 10/1984 | Kimura | |
| 4,626,079 A | 12/1986 | Nakamura et al. | |
| 4,767,172 A | 8/1988 | Nichols et al. | |

(Continued)

FOREIGN PATENT DOCUMENTS

DE         31 00 662 A1    11/1981

(Continued)

OTHER PUBLICATIONS

Wolfson, Richard and Pasachoff, Jay M., "Physics with Modern Physics for Scientists and Engineers", Second Edition, Chapter 35, pp. 900-901, 1995.

(Continued)

*Primary Examiner*—Rochelle-Ann J Blackman
(74) *Attorney, Agent, or Firm*—Blakely Sokoloff Taylor & Zafman LLP

(57) ABSTRACT

Certain exemplary embodiments can provide a method comprising covering a camera lens with a light pipe adapted to: substantially encircle at least a portion of a camera lens that is adapted to focus an image representing an object of photographic interest; extend from a proximal region of said light pipe located substantially adjacent a plurality of lighting elements and toward the object of photographic interest, the plurality of lighting elements located, relative to the object of photographic interest, substantially adjacent a base of the camera lens and substantially behind a face of the camera lens; and convey light from the plurality of lighting elements and toward the object of photographic interest.

36 Claims, 6 Drawing Sheets

U.S. PATENT DOCUMENTS

| | | | |
|---|---|---|---|
| 4,768,133 | A | 8/1988 | Simons et al. |
| 4,930,872 | A | 6/1990 | Convery |
| 4,969,037 | A | 11/1990 | Poleschinski et al. |
| 5,149,948 | A | 9/1992 | Chisholm |
| 5,161,874 | A | 11/1992 | Benes |
| 5,177,346 | A | 1/1993 | Chisholm |
| 5,191,199 | A | 3/1993 | Elko |
| 5,227,642 | A | 7/1993 | Shimizu |
| 5,274,228 | A | 12/1993 | Kaplan |
| 5,331,176 | A | 7/1994 | Sant' Anselmo et al. |
| 5,332,892 | A | 7/1994 | Li et al. |
| 5,349,172 | A | 9/1994 | Roustaei |
| 5,349,210 | A | 9/1994 | Ackley et al. |
| 5,354,977 | A | 10/1994 | Roustaei |
| 5,362,953 | A | 11/1994 | McKenna et al. |
| 5,378,883 | A | 1/1995 | Batterman et al. |
| 5,399,852 | A | 3/1995 | Zheng et al. |
| 5,406,060 | A | 4/1995 | Gitin |
| 5,408,084 | A | 4/1995 | Brandorff et al. |
| 5,481,101 | A | 1/1996 | Yoshida |
| 5,497,267 | A | 3/1996 | Ishikawa et al. |
| 5,506,663 | A | 4/1996 | Ulrich et al. |
| 5,506,929 | A | 4/1996 | Tai et al. |
| 5,508,504 | A | 4/1996 | Dvorkis et al. |
| 5,515,452 | A | 5/1996 | Penkethman et al. |
| 5,517,018 | A | 5/1996 | Zheng et al. |
| 5,532,467 | A | 7/1996 | Roustaei |
| 5,539,485 | A | 7/1996 | White |
| 5,550,362 | A | 8/1996 | Sherman |
| 5,567,934 | A | 10/1996 | Zheng et al. |
| 5,569,902 | A | 10/1996 | Wood et al. |
| 5,572,006 | A | 11/1996 | Wang et al. |
| 5,574,804 | A | 11/1996 | Olschafskie et al. |
| 5,584,558 | A | 12/1996 | Nath |
| 5,586,212 | A | 12/1996 | McConica et al. |
| 5,619,029 | A | 4/1997 | Roxby et al. |
| 5,656,803 | A | 8/1997 | Seo |
| 5,690,417 | A | 11/1997 | Polidor et al. |
| 5,697,699 | A | 12/1997 | Seo et al. |
| 5,786,586 | A | 7/1998 | Pidhirny et al. |
| 5,844,228 | A | 12/1998 | Nukui et al. |
| 5,859,418 | A | 1/1999 | Li et al. |
| 5,907,148 | A | 5/1999 | Iwafuchi et al. |
| 5,923,022 | A | 7/1999 | Penn et al. |
| 5,945,661 | A | 8/1999 | Nukui et al. |
| 5,959,283 | A | 9/1999 | Tawara et al. |
| 5,992,746 | A | 11/1999 | Suzuki |
| 6,006,990 | A | 12/1999 | Ye et al. |
| 6,022,124 | A | 2/2000 | Bourn et al. |
| 6,033,090 | A | 3/2000 | Seo |
| 6,181,471 | B1 | 1/2001 | Miyoshi |
| 6,247,645 | B1 | 6/2001 | Harris et al. |
| 6,352,204 | B2 | 3/2002 | Hattersley et al. |
| 7,386,227 | B1 * | 6/2008 | Henderson .................. 396/164 |
| 2004/0125215 | A1 * | 7/2004 | Wallace .................... 348/223.1 |
| 2006/0039692 | A1 * | 2/2006 | Lee et al. ..................... 396/198 |
| 2006/0175409 | A1 | 8/2006 | Reichenbach et al. |
| 2006/0209417 | A1 * | 9/2006 | Kojima ....................... 359/618 |

FOREIGN PATENT DOCUMENTS

| | | |
|---|---|---|
| DE | 10146158 A1 | 4/2003 |
| EP | 0 185 782 A1 | 7/1986 |
| JP | 58028712 (A) | 2/1983 |
| JP | 61270720 (A) | 12/1986 |
| JP | 2001034702 (A) | 2/2001 |
| WO | WO 99/49347 | 9/1999 |
| WO | WO 2005/043449 A1 | 5/2005 |
| WO | WO 2008/036414 A2 | 3/2008 |

OTHER PUBLICATIONS

International Search Report and Written Opinion, International Application No. PCT/US2007/020539, mail date Jul. 1, 2008.

International Preliminary Report on Patentability, International Application No. PCT/US2007/020539, mail date Nov. 3, 2008.

* cited by examiner

LENS PROTECTOR

CROSS-REFERENCES TO RELATED APPLICATIONS

This application claims priority to, and incorporates by reference herein in its entirety, pending U.S. Provisional Patent Application Ser. No. 60/846,286, filed 21 Sep. 2006.

BACKGROUND

Machine vision is being used in more industrial applications every day. As the applications expand, the environments that camera systems are being applied in are getting harsher. Cameras that are waterproof and hardened have become an important part of the machine vision product offering. At the same time, machine vision lighting can be an important part of a successful machine vision implementation. Simultaneously protecting the camera and the lighting elements, while presenting illumination in relatively close proximity to an object of photographic interest, has proven somewhat elusive.

SUMMARY

Certain exemplary embodiments provide environmental protection for a machine vision camera. Certain exemplary embodiments provide an innovative method of delivering light.

Certain exemplary embodiments can provide an efficient solution in meeting lighting and/or environmental protection requirements, such as in machine vision applications. Certain exemplary embodiments can provide lighting elements in the general vicinity of, surrounding, and/or behind the camera lens, yet can utilize a light pipe to provide environmental protection to the lens and to channel light from the lighting elements to the object of photographic interest. Using a light pipe allows all the lighting elements (e.g., LEDs) to be mounted behind the lens on the camera with the light brought in front of the camera using the internal reflection properties of the light pipe's clear plastic construction.

Certain exemplary embodiments can provide a method comprising covering a camera lens with a light pipe adapted to: substantially encircle at least a portion of a camera lens that is adapted to focus an image representing an object of photographic interest; extend from a proximal region of said light pipe located substantially adjacent a plurality of lighting elements and toward the object of photographic interest, the plurality of lighting elements located, relative to the object of photographic interest, substantially adjacent a base of the camera lens and substantially behind a face of the camera lens; and convey light from the plurality of lighting elements and toward the object of photographic interest.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

The front surface of the light pipe can be shaped in many different forms to best suit the needs of the particular photographic application. The front face of the light pipe can be configured in any of at least 3 ways:

molded lens—molding the front surface of the plastic into a lens element (e.g., Fresnel, concave, convex);

directed light—using the shape of the external and or internal surfaces of the light pipe to direct the light; and/or diffuse surface—using a diffused surface on the front of the light pipe to create a wash of light over the part.

Figure 1:
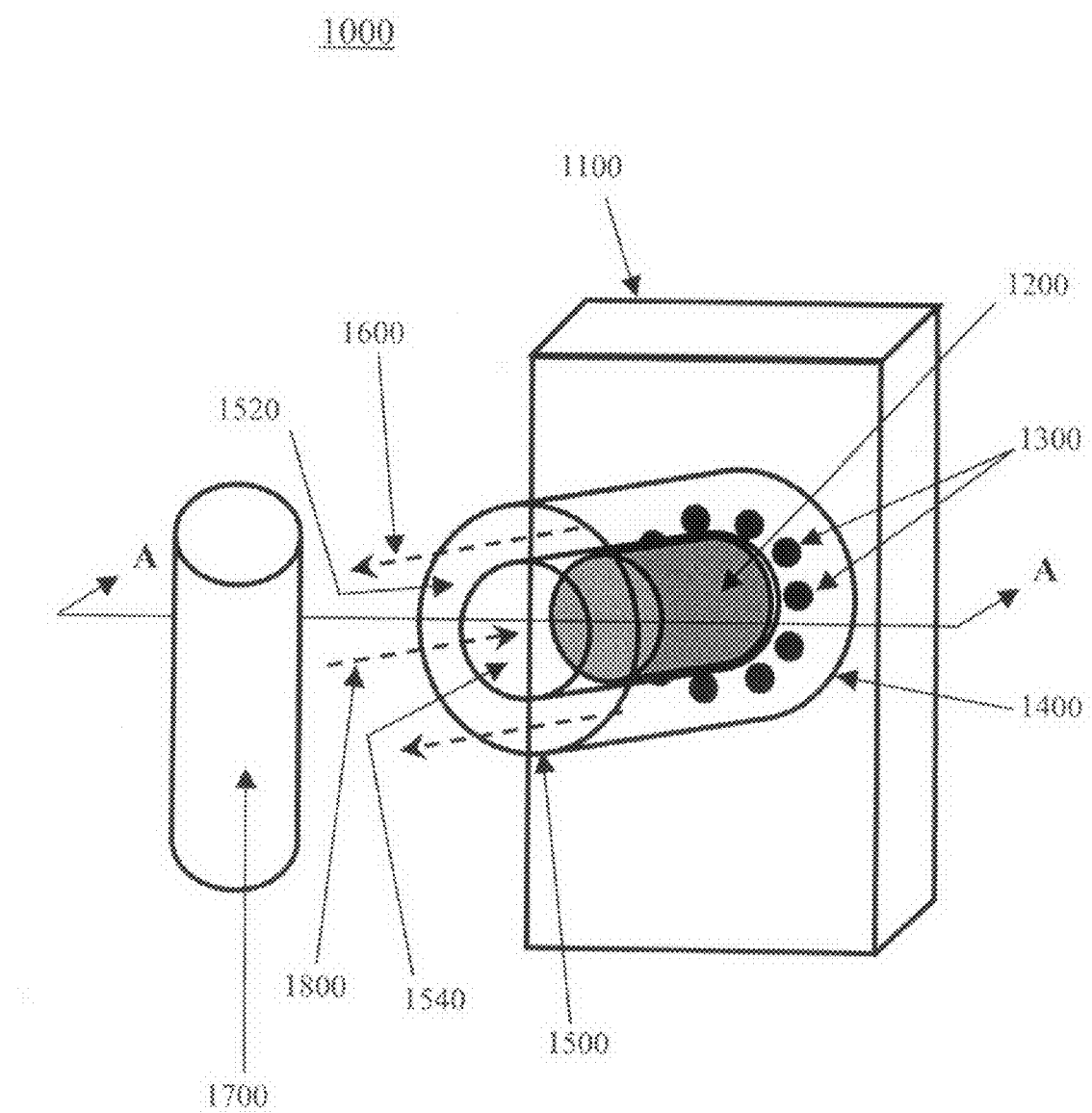
FIG. 1 is a perspective view of an exemplary embodiment of a generic system 1000.

FIG. 1 is a perspective view of an exemplary embodiment of a generic system 1000, which can comprise a camera 1100, which can be adapted to capture and/or process light 1600 striking an image sensor and/or film of the camera to form a photographic image of an object 1700. Attached to and/or integral to camera 1100 can be a camera lens 1200. Attached to and/or integral to camera 1100 can be a printed circuit board to which a plurality of light emitting diodes (LED's) 1300 can be mechanically and/or electrically coupled. LED's 1300 can surround and/or encircle lens 1200 and can provide sufficient light to illuminate object 1700 for camera 1100 to capture a photographic image thereof.

Protecting lens 1200 and/or LED's 1300 from exposure to environmental hazards can be a light pipe 1400, a longitudinally extending wall of which can have a sufficient base thickness to receive substantially all light emitted by LED's 1300. Light pipe 1400 can be substantially transparent to light, such that light 1600 emitted by LED's 1300 is channeled within the longitudinal wall of light pipe 1400 and is emitted by light pipe 1400 at a light-emitting region 1520 of a face 1500 of light pipe 1400.

The light emitted by light pipe 1400 can reflect from object 1700. At least some light 1800 reflected from object 1700 can enter a substantially transparent light entry region 1540 of face 1500, travel through a substantially empty interior region of light pipe 1400 and enter a face of lens 1200 to be focused for processing by camera 1100. Thus, light pipe 1400 can both protect lens 1200 and LED's 1300 from hazards and deliver light in relatively close proximity to object 1700 to enhance the quality of images representing object 1700.

Figure 2:
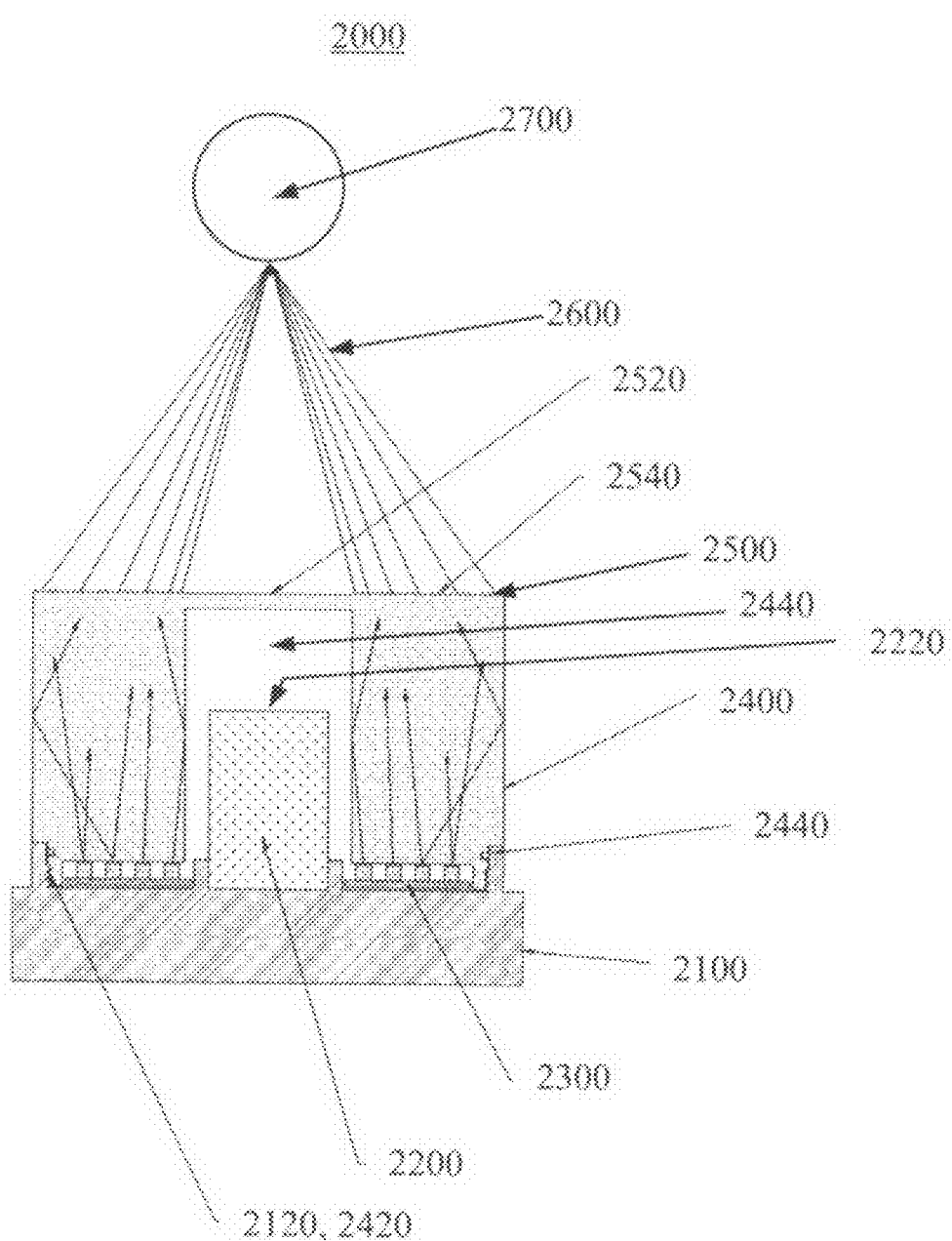
FIG. 2 is a cross-sectional view of an exemplary embodiment of a system 2000 taken at line A-A of FIG. 1.

FIG. 2 is a cross-sectional view of an exemplary embodiment of a system 2000 taken at A-A of FIG. 1. System 2000 can comprise a camera 2100 to which can be coupled, mounted, and/or connected a camera lens 2200. Adjacent and/or surrounding lens 2200 and/or located behind a face of lens 2200 can be one or more circuit-board mounted lighting elements 2300, such as LED's, which can be arranged as one or more concentric circular arrays. Protecting lens 2200 and/or lighting elements 2300 can be a light pipe 2400, a proximal region of which can mount to camera 2100 via mating mounting threads 2120 and 2420. A seal 2440, such as an O-ring and/or gasket can resist incursion of water and/or ensure a substantially weather-tight fit between light pipe 2400 and camera 2100.

At a face 2500 of light pipe 2400 located in a region that is substantially distal from lighting elements 2300 can be a light emitting portion 2540, which can comprise a lens, such as a Fresnel lens, that is adapted to focus the emitted light 2600 on an object 2700 of photographic interest. Light reflected from object 2700 can enter a substantially transparent light entry region 2520 of face 2500, travel through a substantially empty interior region 2440 of light pipe 2400 and enter a face 2220 of lens 2200 to be focused for processing by camera 2100.

Figure 3:
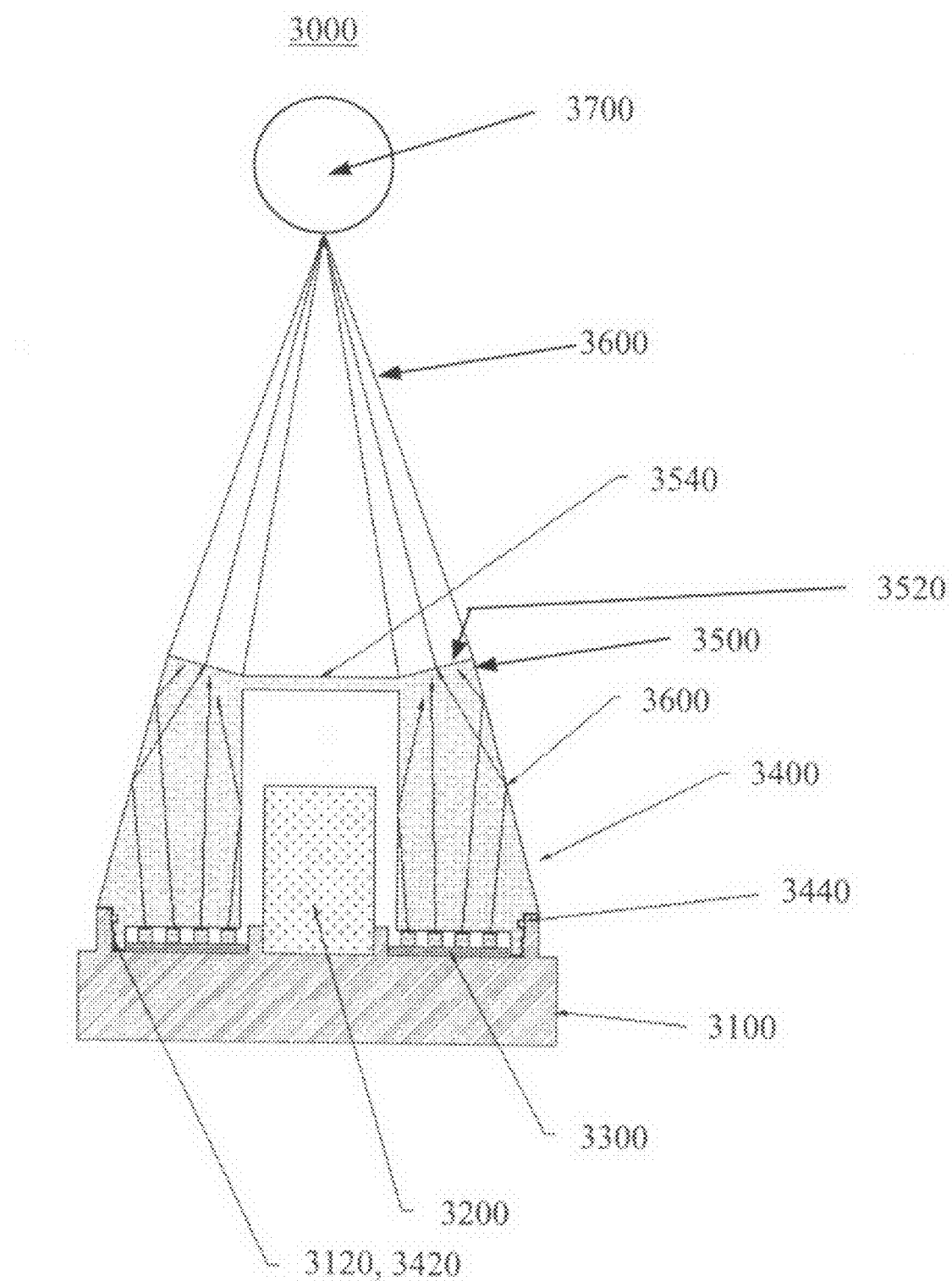
FIG. 3 is a cross-sectional view of an exemplary embodiment of a system 3000 taken at line A-A of FIG. 1.

FIG. 3 is a cross-sectional view of an exemplary embodiment of a system 3000 taken at A-A of FIG. 1. System 3000 can comprise a camera 3100 to which can be coupled, mounted, and/or connected a camera lens 3200. Adjacent and/or surrounding lens 3200 can be one or more circuit-board mounted lighting elements 3300, such as LED's, which can be arranged as one or more concentric circular arrays. Protecting lens 3200 and/or lighting elements 3300 can be a light pipe 3400, which can mount to camera 3100 via mating mounting threads 3120 and 3420. A seal 3440, such as an O-ring and/or gasket can ensure a substantially weather-tight fit between light pipe 3400 and camera 3100.

Due to the angled and/or reflective outer and/or inner walls of light pipe 3400, light 3600 emitted by lighting elements 3300 can reflect within light pipe 3400. At a face 3500 of light pipe 3400 can be a light emitting portion 3520, which can comprise an emitted light lens, such as a Fresnel lens, that is adapted to focus the emitted light 3600 on an object 3700 of photographic interest. Light reflected from object 3700 can enter a substantially transparent light entry region 3540 of face 3500, travel through a substantially empty interior region of light pipe 3400 and enter a face of lens 3200 to be focused for processing by camera 3100.

Figure 4:
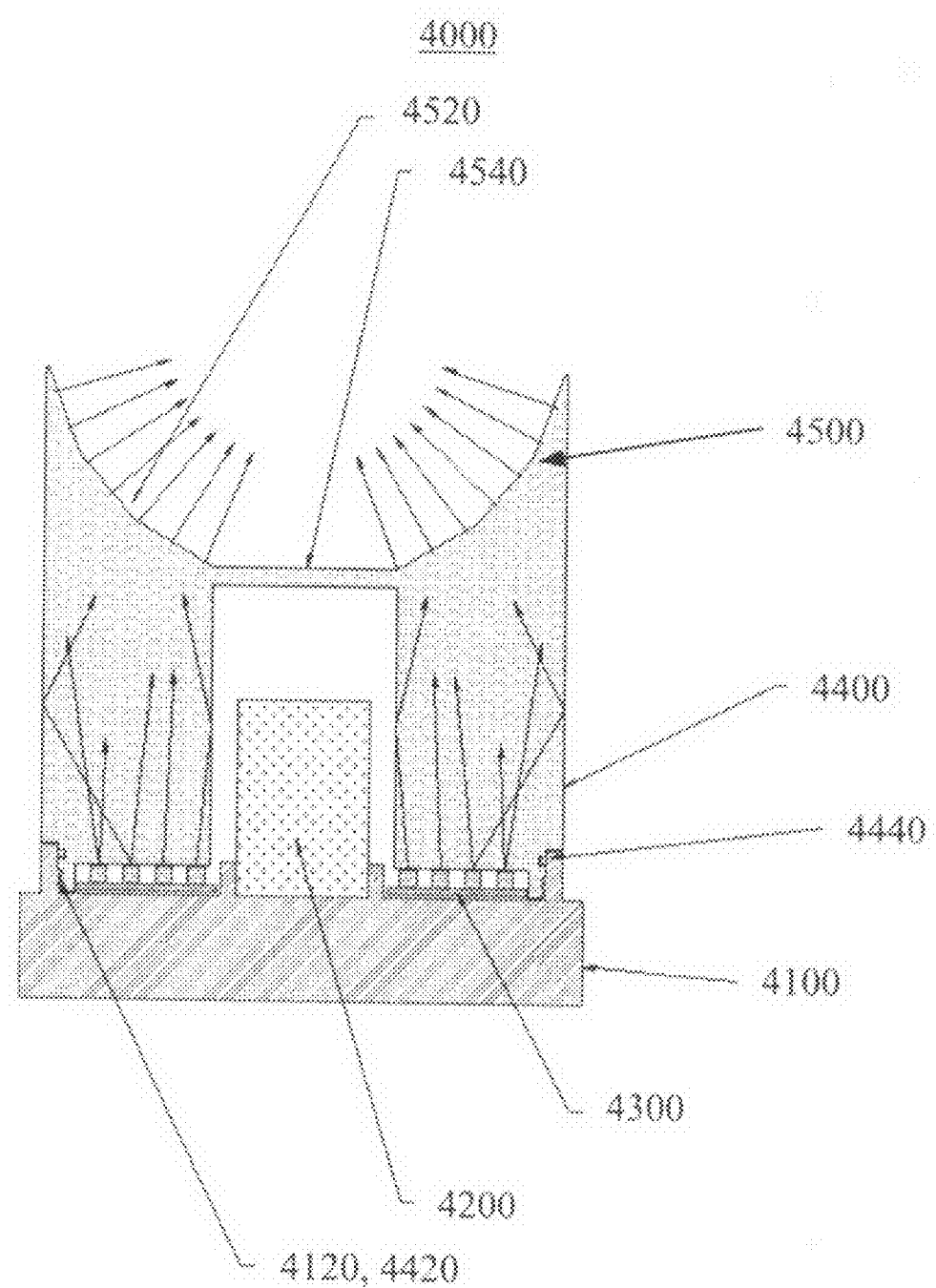
FIG. 4 is a cross-sectional view of an exemplary embodiment of a system 4000 taken at line A-A of FIG. 1.

FIG. 4 is a cross-sectional view of an exemplary embodiment of a system 4000 taken at A-A of FIG. 1. System 4000 can comprise a camera 4100 to which can be coupled, mounted, and/or connected a camera lens 4200. Adjacent and/or surrounding lens 4200 can be one or more circuit-board mounted lighting elements 4300, such as LED's, which can be arranged as one or more concentric circular arrays. Protecting lens 4200 and/or lighting elements 4300 can be a light pipe 4400, which can mount to camera 4100 via, for example, mating mounting threads 4120 and 4420. A seal 4440, such as an O-ring and/or gasket can help ensure a substantially weather-tight fit between light pipe 4400 and camera 4100.

At a face 4500 of light pipe 4400 can be a light emitting portion 4520, which can comprise a light diffusion surface, such as a roughened, grooved, sanded, and/or sand-blasted surface, that is adapted to diffuse the emitted light 4600 to create a wash of light over an object of photographic interest. Light reflected from the object can enter a substantially transparent light entry region 4540 of face 4500, travel through a substantially empty interior region of light pipe 4400 and enter a face of lens 4200 to be focused for processing by camera 4100.

Figure 5:
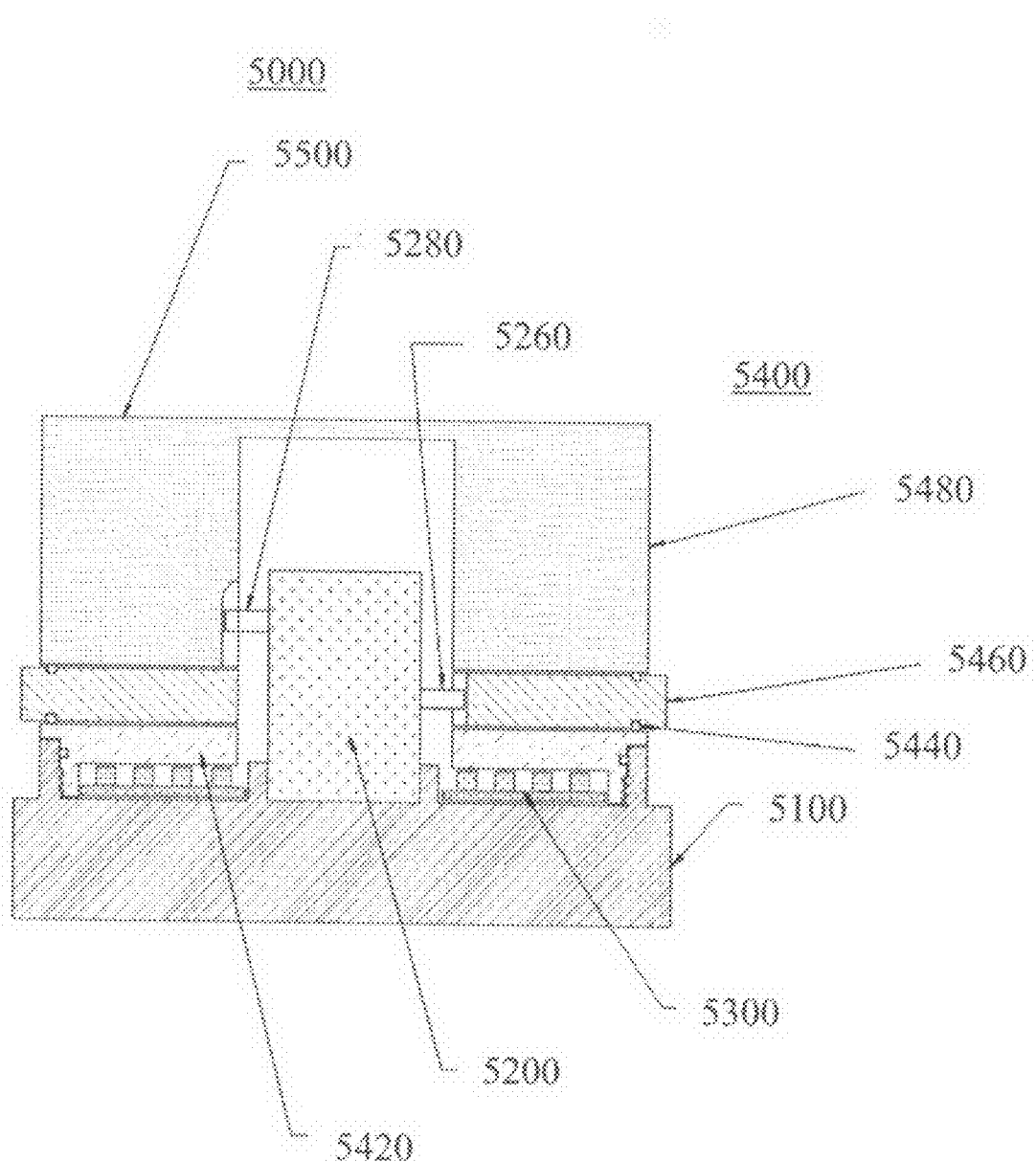
FIG. 5 is a cross-sectional view of an exemplary embodiment of a system 5000 taken at line A-A of FIG. 1.

FIG. 5 is a cross-sectional view of an exemplary embodiment of a system 5000 taken at A-A of FIG. 1. System 5000 can comprise a camera 5100 to which can be coupled, mounted, and/or connected a camera lens 5200. Adjacent and/or surrounding lens 5200 can be one or more circuit-board mounted lighting elements 5300, such as LED's, which can be arranged as one or more concentric circular arrays.

Protecting lens 5200 and/or lighting elements 5300 can be a light pipe 5400, a base portion 5420 of which can mount to camera 5100. Coupled to base portion 5420 can be a substantially transparent, rotatable, F-stop ring portion 5460 that is adapted to interface, such as via a stud 5260 mounted in an F-stop lock hole, with a rotatable F-stop adjustment of lens 5200, which can control a quantity of received light in camera 5100. Coupled to F-stop ring 5460 can be a substantially transparent, rotatable, focus ring portion 5480 that is adapted to interface, such as via a stud 5280 mounted in a focus lock hole, with a rotatable focus adjustment of lens 5200 to control a focal length and/or distance of lens 5200 to control a quality of an image created by light received by camera 5100. Note that a diameter of F-stop ring portion 5460 can be greater than a diameter of base portion 5420 and/or focus ring portion 5480.

Seals 5440, such as an O-ring and/or gasket can help ensure a substantially weather-tight fit between light pipe 5400 and camera 5100, and between each component 5420, 5460, and/or 5480 of light pipe 5400. At a face 5500 of light pipe 5400 can be a light emitting portion, which can comprise any form described herein. Thus, the components 5420, 5460, and/or 5480 of light pipe 5400 can allow for the adjustment of F-stop and/or focus without removing the protective cover provided by light pipe 5400.

Figure 6:
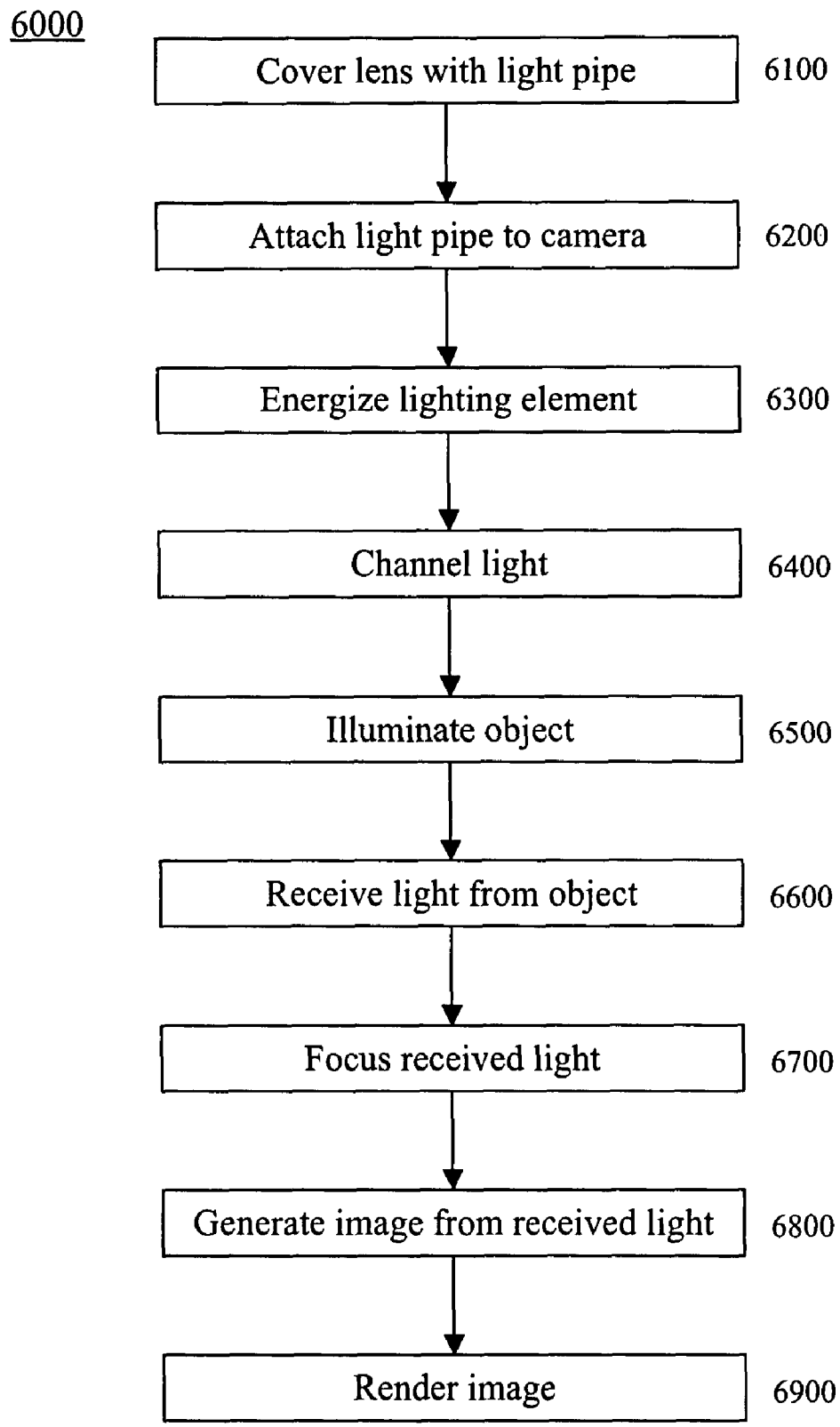
FIG. 6 is a flowchart of an exemplary embodiment of a method 6000.

FIG. 6 is a flowchart of an exemplary embodiment of a method 6000. At activity 6100, a camera lens can be covered with a light pipe, such as any light pipe described herein. At activity 6200, the light pipe can be coupled and/or attached to a camera to which the lens is attached. At activity 6300, any of a plurality of lighting elements can be energized such that the element(s) emit light. At activity 6400, the light emitted by the lighting elements can enter the light pipe and be transmitted substantially longitudinally through the light pipe and emitted from at least a portion of a face of the light pipe. At activity 6500, light emitted from the light pipe can illuminate at least a portion of an object of photographic interest. At activity 6600, light reflected and/or emitted from the object of photographic interest can enter at least a portion of a face of the light pipe and then enter the camera lens. At activity 6700, the camera lens can focus received light onto an image sensor and/or film. At activity 6800, the received focused light can be processed to generate an image substantially representative of at least a portion of the object. At activity 6900, the image can be stored and/or rendered.

DEFINITIONS

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

activity—an action, act, step, and/or process or portion thereof.

adapted—suitable, fit, and/or capable of performing a specified function.

adapted to—made suitable or fit for a specific use or situation.

adjacent—in close proximity to, near, next to, and/or adjoining.

adjust—to change, modify, adapt, and/or alter.

allow—to provide, let do, happen, and/or permit.

and/or—either in conjunction with or in alternative to.

apparatus—an appliance or device for a particular purpose.

at least—not less than.

attach—to fasten, secure, and/or join.

base—a supporting and/or mounted portion of an item.

behind—on the farther side of rearward of; and/or in, to, or toward the rear.

camera—a device often comprising a lightproof enclosure having an aperture with a lens through which a still and/or moving image of an object is focused and recorded on a photosensitive film, plate, tape, and/or or sensor coupled to an electronic and/or optical memory device (e.g., RAM, EEPROM, flash memory, magnetic disk, optical disk, etc.).

can—is capable of, in at least some embodiments.

capture—to obtain and/or record image data in preparation for processing and/or storage.

comprises—includes, but is not limited to, what follows.

comprising—including but not limited to, what follows.

connect—physically or logically join, link, couple, and/or fasten two or more entities.

connected—physically and/or logically linked.

convey—to transmit, transport, guide, and/or carry.

couple—to join, connect, and/or link two things together.

coupled—connected or linked by any known way, including mechanical, fluidic, acoustic, electrical, magnetic, optical, etc.

cover—to overlay, place upon and/or over, and/or immerse.

define—to establish the meaning, relationship, outline, form, and/or structure of; and/or to precisely and/or distinctly describe and/or specify.

device—a machine, manufacture, and/or collection thereof.

different—changed, distinct, and/or separate.

diffuse—to expand the diameter of a light source, reduce the effects of focused and/or collimated lighting, and/or redistribute light as the light passes through it, creating a more homogeneous emission of light.

distal—farther to a point of reference, such as a portion of an extended hand that is further from the face.

each—every one of a group considered individually.

element—a component.

emit—to give off, send forth, and/or discharge.

encircle—to surround, ring, encompass, and/or form a closed, potentially non-circular, circuit around.

end—an extremity and its vicinity of something that has length; a terminus.

exposure level—a size of an aperture through which radiation and/or photons enter a camera to strike a film or image sensor.

extend—reach spatially outward.

face—the most significant or prominent surface of an object.

facilitate—to help bring about, encourage, and/or allow.

focal length—the distance from the surface and/or optical center of a lens or mirror to its focal point.

focus—to cause energy and/or light to concentrate or converge.

from—used to indicate a source.

further—in addition.

image—an at least two-dimensional representation of an entity and/or phenomenon.

incursion—entry.

interest—desire.

interior region—a spatial zone within a predetermined boundary.

lens—a piece of transparent substance, usually glass, having two opposite surfaces either both curved or one curved and one plane, used in an optical device for changing the convergence and/or focal point of light rays.

light—electromagnetic radiation having a wavelength within a range of approximately 300 nanometers to approximately 1000 nanometers, including any and all values and subranges therebetween.

light emitting diode (LED)—a semiconductor device that emits (typically visible) light responsive to an applied electrical conducting current.

light pipe—an elongate device having a substantially annular cross-sectional longitudinal wall, that wall adapted to substantially transparently and/or substantially efficiently transport and/or channel light in the longitudinal direction, the outer and inner substantially circumferential surfaces of that wall not necessarily transparent.

lighting—adapted to produce electromagnetic radiation at least within a visible wavelength.

located—situated in a particular spot and/or position.

longitudinal—of and/or relating to a length; placed and/or running lengthwise.

may—is allowed and/or permitted to, in at least some embodiments.

method—a process, procedure, and/or collection of related activities for accomplishing something.

mount—(n) that upon which a thing is attached. (v) to couple, fix, and/or attach on and/or to something.

object—a physical thing.

over—with reference to.

photographic—pertaining to the recording of an image.

plurality—the state of being plural and/or more than one.

portion—a part, component, section, percentage, ratio, and/or quantity that is less than a larger whole. Can be visually, physically, and/or virtually distinguishable and/or non-distinguishable.

predetermined—established in advance.

probability—a quantitative representation of a likelihood of an occurrence.

proximal—nearer to a point of reference, such as a portion of an extended hand that is nearer the face.

reach—to arrive at.

reflect—to bounce incident light from a surface.

region—an area and/or zone.

relative—considered with reference to and/or in comparison to something else.

repeatedly—again and again; repetitively.

resist—to avoid, act, and/or remain firm against and/or in opposition to the actions, effects, and/or force of.

ring—a substantially toroidal object which can be imagined as having been generated by rotating a closed loop (e.g., ellipse, circle, irregular curve, polygon, etc.) about a fixed line external to the loop.

said—when used in a system or device claim, an article indicating a subsequent claim term that has been previously introduced.

seal—a device adapted to shut close; to keep close; to make fast; to keep secure; and/or to prevent leakage.

set—a related plurality.

stop—cease or end.

substantially—to a considerable, large, and/or great, but not necessarily whole and/or entire, extent and/or degree.

system—a collection of mechanisms, devices, data, and/or instructions, the collection designed to perform one or more specific functions.

threaded—comprising a helical or spiral ridge used for advancing a shaft in a longitudinal direction, such as found on screws, nuts, and bolts.

through—in one side and out another side of.

toward—used to indicate a destination.

transmit—to provide, furnish, supply, send as a signal, and/or to convey (e.g., force, energy, and/or information) from one place and/or thing to another.

transparent—having the property of transmitting rays of light through its substance so that bodies situated beyond or behind can be distinctly seen.

via—by way of and/or utilizing.

wall—a partition, structure, and/or mass that serves to enclose, divide, separate, segregate, define, and/or protect a volume and/or to support a floor, ceiling, and/or another wall.

weight—a value indicative of importance.

wherein—in regard to which; and; and/or in addition to.

within—inside.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, performed by multiple entities, and/or performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

Accordingly, every portion (e.g., title, field, background, summary, abstract, drawing figure, etc.) of this application, other than the claims themselves, is to be regarded as illustrative in nature, and not as restrictive.

What is claimed is:

1. A lens protector having a proximal end and a distal end, the lens protector comprising:
   a light pipe defined by an exterior cylindrical surface, an interior cylindrical surface, the proximal end and the distal end;
   a plurality of lighting elements optically coupled to the proximal end of the light pipe;
   an interior cavity defined by the interior cylindrical surface, the proximal end, and the distal end; and
   a cover that closes the distal end of the interior cavity, wherein the interior cavity can accommodate at least part of a camera lens through the proximal end.

2. The apparatus of claim 1 wherein the proximal end of the light pipe is threaded.

3. The apparatus of claim 2, further comprising a seal positioned at or near the threaded proximal end.

4. The apparatus of claim 1 wherein the distal end of the lens protector includes a light emitting region and a light entry region, the light entry region substantially corresponding to the covered end of the interior cavity.

5. The apparatus of claim 4 wherein the light-emitting region is formed into a concave, convex, or Fresnel lens element.

6. The apparatus of claim 4 wherein the light-emitting region is shaped to direct light in a specific direction.

7. The apparatus of claim 4 wherein the light-emitting region is a diffuse surface.

8. The apparatus of claim 1 wherein the light pipe is a right annular cylinder.

9. The apparatus of claim 1 wherein the lens protector further comprises a rotatable F-stop ring positioned in the light pipe, wherein the rotatable F-stop ring can be coupled to an F-stop ring on the camera lens when positioned within the interior cavity to facilitate adjustment of an exposure level of an image in a camera.

10. The apparatus of claim 1 wherein the lens protector further comprises a rotatable focus ring positioned in the light pipe, wherein the rotatable focus ring can be coupled to a focus ring on the camera lens when positioned within the interior cavity to facilitate focusing of an image in a camera.

11. A system comprising:
   a camera including a mount surrounding a lens opening, wherein the lens opening can accommodate a camera lens;
   a plurality of light elements positioned on the mount adjacent to the lens opening; and
   a lens protector having a proximal end and a distal end, the proximal end being coupled to the mount and optically coupled to the plurality of light elements, and the lens protector comprising:
      a light pipe defined by an exterior cylindrical surface, an interior cylindrical surface, the proximal end and the distal end;
      an interior cavity defined by the interior cylindrical surface, the proximal end, and the distal end; and
      a cover that closes the distal end of the interior cavity, wherein the interior cavity can accommodate at least part of the camera lens through the proximal end.

12. The system of claim 11 wherein the plurality of light elements substantially surround the lens opening.

13. The system of claim 11 wherein the proximal end of the lens protector is threaded and the mount includes a threaded portion that can engage with the threaded proximal end.

14. The system of claim 11, further comprising a seal positioned substantially at the interface between the lens protector and the mount.

15. The system of claim 11 wherein the distal end of the lens protector includes a light emitting region and a light entry region, the light entry region substantially corresponding to the covered end of the interior cavity.

16. The system of claim 15 wherein the light-emitting region is formed into a concave, convex, or Fresnel lens element.

17. The system of claim 15 wherein the light-emitting region is shaped to direct light in a specific direction.

18. The system of claim 15 wherein the light-emitting surface is a diffuse surface.

19. The system of claim 11 wherein the light pipe is a right annular cylinder.

20. The system of claim 11, further comprising a camera lens positioned in the lens opening.

21. The system of claim 11 wherein the lens protector further comprises a rotatable F-stop ring positioned in the light pipe, wherein the rotatable F-stop ring can be coupled to an F-stop ring on the camera lens when positioned within the interior cavity to facilitate adjustment of an exposure level of an image in a camera.

22. The system of claim 11 wherein the lens protector further comprises a rotatable focus ring positioned in the light pipe, wherein the rotatable focus ring can be coupled to a focus ring on the camera lens when positioned within the interior cavity to facilitate focusing of an image in a camera.

23. A method comprising:
covering at least part of a camera lens with a lens protector having a proximal end and a distal end, the lens protector comprising:
  a light pipe defined by an exterior cylindrical surface, an interior cylindrical surface, the proximal end and the distal end,
  an interior cavity defined by the interior cylindrical surface, the proximal end, and the distal end, and
  a cover that closes the distal end of the interior cavity, wherein the interior cavity can accommodate at least part of the camera lens through the proximal end.

24. The method of claim 23, further comprising optically coupling the proximal end of the light pipe to a plurality of light sources.

25. The method of claim 23, further comprising attaching the lens protector to a camera coupled to the camera lens.

26. The method of claim 25 wherein attaching the lens protector to a camera comprises engaging a threaded portion of the lens protector to a threaded portion of the camera.

27. The method of claim 23, further comprising sealably attaching the lens protector to a camera coupled to the camera lens.

28. The method of claim 27 wherein sealably attaching the lens protector to a camera comprises positioning a seal at the interface between the lens protector and the camera.

29. The method of claim 23 wherein the distal end of the lens protector includes a light emitting region and a light entry region, the light entry region substantially corresponding to the covered end of the interior cavity.

30. The method of claim 29 wherein the light-emitting region is formed into a concave, convex, or Fresnel lens element.

31. The method of claim 29 wherein the light-emitting region is shaped to direct light in a specific direction.

32. The method of claim 29 wherein the light-emitting surface is a diffuse surface.

33. The method of claim 23 wherein the lens protector further comprises a rotatable F-stop ring positioned in the light pipe, wherein the rotatable F-stop ring can be coupled to an F-stop ring on the camera lens when positioned within the interior cavity to facilitate adjustment of an exposure level of an image in a camera.

34. The method of claim 23 wherein the lens protector further comprises a rotatable focus ring positioned in the light pipe, wherein the rotatable focus ring can be coupled to a focus ring on the camera lens when positioned within the interior cavity to facilitate focusing of an image in a camera.

35. A lens protector having a proximal end and a distal end, the lens protector comprising:
  a light pipe defined by an exterior cylindrical surface, an interior cylindrical surface, the proximal end and the distal end;
  an interior cavity defined by the interior cylindrical surface, the proximal end, and the distal end;
  a cover that closes the distal end of the interior cavity, wherein the interior cavity can accommodate at least part of a camera lens through the proximal end; and
  a rotatable F-stop ring positioned in the light pipe, wherein the rotatable F-stop ring can be coupled to an F-stop ring on the camera lens when positioned within the interior cavity to facilitate adjustment of an exposure level of an image in a camera.

36. A lens protector having a proximal end and a distal end, the lens protector comprising:
  a light pipe defined by an exterior cylindrical surface, an interior cylindrical surface, the proximal end and the distal end;
  an interior cavity defined by the interior cylindrical surface, the proximal end, and the distal end;
  a cover that closes the distal end of the interior cavity, wherein the interior cavity can accommodate at least part of a camera lens through the proximal end; and
  a rotatable focus ring positioned in the light pipe, wherein the rotatable focus ring can be coupled to a focus ring on the camera lens when positioned within the interior cavity to facilitate focusing of an image in a camera.

* * * * *